Nov. 23, 1954  D. KLIJZING ET AL  2,694,990
FURNACE FOR BURNING SOLID FUELS
Filed Jan. 30, 1951  3 Sheets-Sheet 1
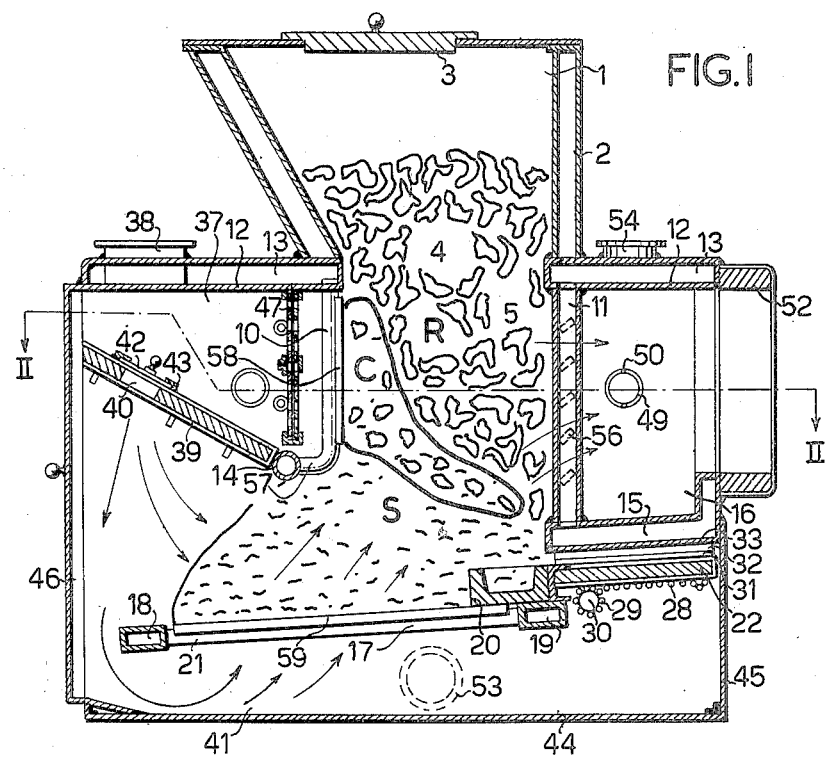
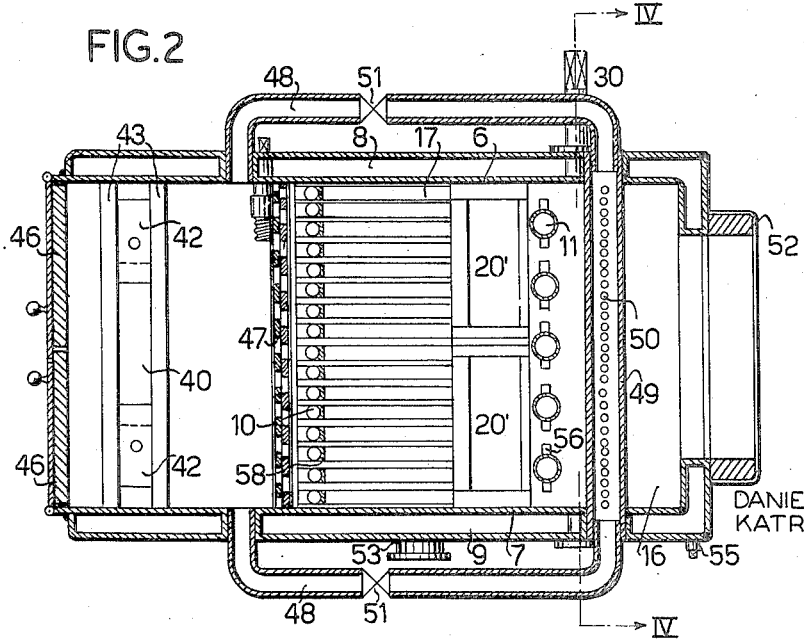
INVENTORS
DANIEL KLIJZING
KATRINUS IDEMA
By Cushman, Darby & Cushman
ATTORNEYS

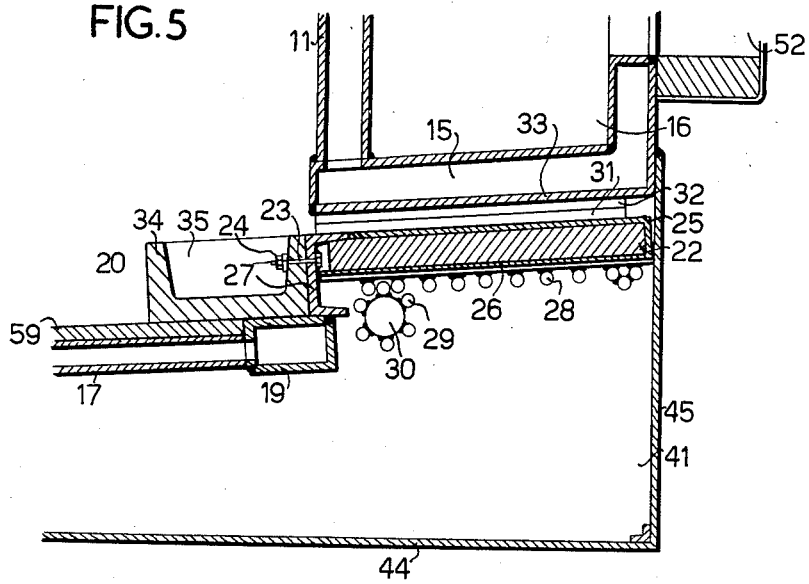
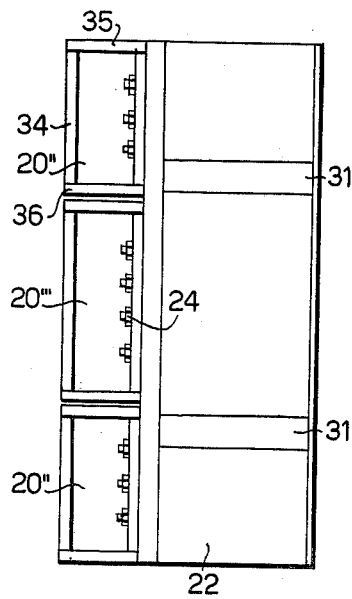

2,694,990

FURNACE FOR BURNING SOLID FUELS

Daniël Klijzing, Amersfoort, and Katrinus Idema, Voorburg, Netherlands, assignors to De Directie van de Staatsmijnen in Limburg, handelend voor en namens de Staat der Nederlanden, Heerlen, Netherlands Application January 30, 1951, Serial No. 208,493

Claims priority, application Netherlands January 31, 1950

3 Claims. (Cl. 110—29)

This invention relates to a furnace for burning solid fuels. More particularly the invention relates to those furnaces which are provided with a slag and ash removing device for moving slag and ashes out of the combustion chamber.

The present invention embodies several features described in our copending United States applications Serial Nos. 204,194, filed January 3, 1951, and 208,491, filed January 30, 1951.

Usually, the combustion residues such as slag and cinders which are removed from the combustion chamber by the slag removing device and deposited in the ashpit are still in an incandescent condition and contain unburned fuel which is not allowed to completely burn and give off its heat in the main combustion zone.

According to the present invention a slag pushing device is provided for moving the slag and combustion residues to a final zone of combustion where the last remaining fuel values are released from the slag.

During the operation of the furnace the slag pusher is exposed to the high temperatures prevailing in the combustion chamber and, since the pusher can transmit only a small part of this heat, it is frequently damaged by the fire. One of the important objects of our invention is, therefore, to lessen such damage by providing means for abstracting the heat from the slag pusher.

Another object of the invention is to enable a damaged part of the slag pusher to be easily renewed without replacing the complete slag pusher assembly.

A further object of the invention is to construct the parts of the slag pusher in such a way that the nuts and bolts for interconnecting these parts are easily accessible and not exposed to the heat in the combustion chamber.

A still further object of the invention is to arrange the parts of the slag pusher in such a way so as to reduce the manufacturing costs of the parts and to obviate the necessity for the factory to maintain large inventories of parts.

Another object of the invention is to provide a furnace installation in which the premises in which this installation has been installed does not become littered by combustion residues.

Further objects and advantages of the invention will become apparent from the following description and claims and from the accompanying drawings, wherein:

Figure 1 is a longitudinal section of a furnace installation which can be used in connection with a central heating boiler;

Figure 2 is a cross-sectional view of the furnace taken on the line II—II of Figure 1;

Figure 5 is a longitudinal section of the slag pusher on a larger scale; and

Figure 6 is a top plan view of the slag pusher showing a modified construction.

Figure 3:
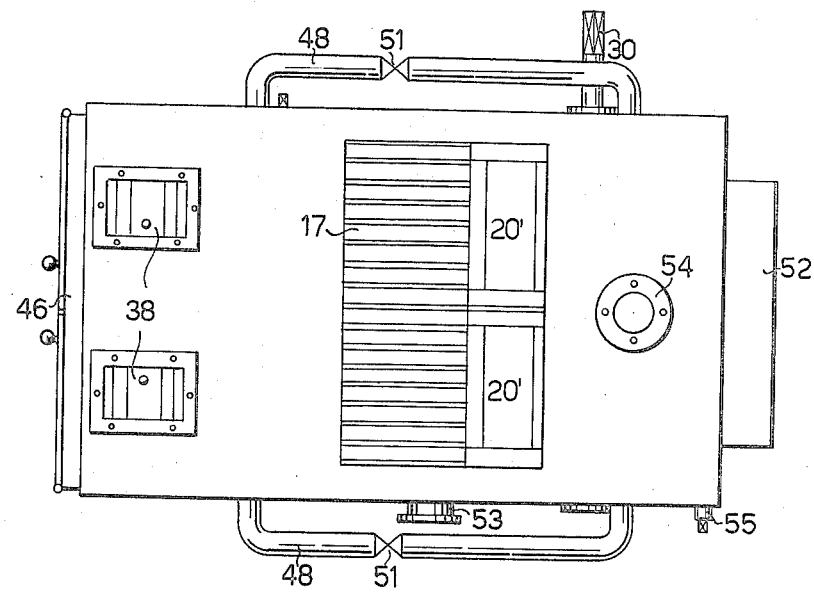
Figure 3 is a top plan view of the furnace shown in Figure 1 in which the feed bin is omitted.
Figure 4:
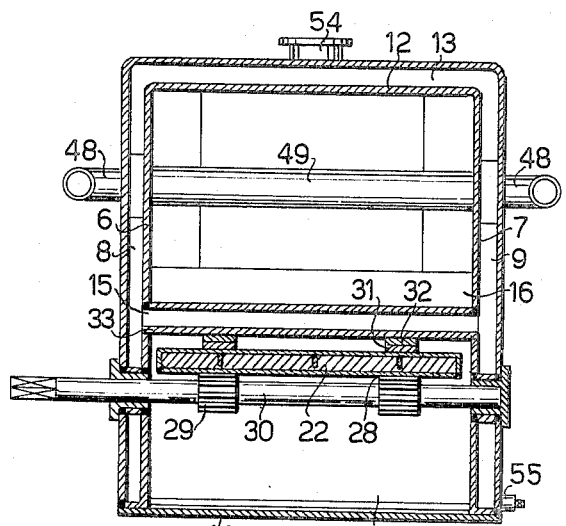
Figure 4 is a sectional view of the furnace taken on the line IV—IV of Figure 2.

The fuel, for instance large coke, is stored in a feed bin 1, which is provided with a water jacket 2 and may be closed by a coverplate 3. The bin 1 discharges by means of opening 4 into the top end of the combustion chamber 5, in which the fuel descends by gravity during operation of the furnace.

The combustion chamber is located between the side walls 6 and 7 of the furnace, which side walls are provided with water jackets 8 and 9, and between two rows of water-cooled pipes 10 and 11. These pipes terminate with their upper ends in the upper wall 12 of the furnace, said wall being provided with a water jacket 13 communicating with the water jackets 8 and 9 of the side walls. The pipes 10 terminate with their lower ends in the collecting header 14, which also communicates with the water jackets 8 and 9. The pipes 11 terminate with their lower ends in a water jacket 15 constituting the bottom of the smoke box 16 and communicating with the water jackets 8 and 9. The pipes 10 are disposed with their lower ends at a higher level than the lower ends of the pipes 11.

The bottom of the combustion chamber 5 consists of a slightly inclined grate 17, which is composed of a plurality of hollow water-cooled bar-like members, opening in headers 18 and 19, which headers communicate with the water jackets 8 and 9. A slag pusher 20 is provided, which may be reciprocated or moved over the grate 17 so as to move the slag underneath the collecting header 14 onto the front portion 21 of the grate. This front portion of the grate permits the slag removed from the bottom of the main combustion chamber to be cooled by part of the primary combustion air and, at the same time, to preheat part of the combustion air before entering the main combustion chamber. In addition, any fuel which may be present in the slag on the extended portion of the grate has an opportunity to react with the combustion air and be completely consumed. The extended portion 21 of the grate, therefore, constitutes a final zone of combustion. A guide shoe member 22 is connected to the slag pusher by means of bolts 23 and nuts 24. The guide shoe consists of a metal casing 25 filled with insulating material 26, the casing being welded to a channel iron 27 to which the slug pusher is connected. The underside of the casing 25 is provided with racks 28, cooperating with pinions 29 fixed to a shaft 30, which protrudes outside the furnace. By rotating this shaft 30 the slag pusher may be moved over the grate whereby the plates 31 which are welded on top of the casing 25 slide along the metal guide plates 32, which are fixed to the outer wall 33 of the water jacket 15. The heat from the combustion chamber which is absorbed by the slag pusher is transmitted by the guide shoe to the guide plates 32 and thence to the water-cooled wall 33 of the furnace with the result that the temperature of the slag pusher is prevented from becoming too high. The guide plates 32 are provided in order to prevent abrasion of the wall 33 by the movement of the guide shoe therealong.

As shown in the Figures 2 and 3, the slag pusher is composed of two uniform component sections 20', which consist of channel irons 34, to which side plates 35 and 36 have been welded so as to constitute a box-shaped member which is open at the top. As a result, the bolts 23 can be arranged in such a manner as to be easily accessible in case deteriorated sections should have to be replaced. Since during operation of the furnace the box-shaped members get filled with ashes, the bolts and nuts are not directly exposed to the heat, so that an additional heat insulating filling for protecting these bolts and nuts may be dispensed with. By composing the slag pusher of two or more sections the advantage is obtained that in case of deterioration caused by heat it is only necessary to replace the damaged section instead of the complete slag pusher assembly.

Combustion air is introduced into an air distribution box 37 by means of a thermostatically controlled fan (not shown) connected with its discharge pipe to the inlet openings 38. From the distribution box which adjoins the pipes 10 part of the air passes through the interstices between these pipes and travels in a substantially horizontal direction through the fuel in the combustion chamber.

The inclined bottom 39 of the distribution box is provided with an opening 40 through which a part of the primary combustion air flows into the ashpit 41 and over the extended grate 21. Slide plates 42 are adapted to move in the guides 43 which are fixed to the bottom 39 of the distribution box. In this way the size of the air passage 40 can be adjusted. From the ashpit the combustion air flows in a generally diagonal direction through the combustion residues and the overlying fuel disposed on the grate 17.

The finer ashes and cinders pass between the grate bars and fall onto the bottom plate 44 of the ashpit. The side walls of the ashpit are formed by the walls 6 and 7 and the rear wall 45. As this rear wall is disposed behind the guide shoe 22, the slag removing mechanism is located entirely over the collecting space 41 for the combustion residues, so that ashes, which during the backward stroke of the slag pusher are pulled over the header 19, also collect in the ashpit without littering the room in which the furnace installation has been installed.

Ashes and cinders accumulating in the ashpit as well as the slag cooled on the extended portion 21 of the grate may be removed from the furnace installation through the doors 46.

The ratio between the amounts of primary combustion air entering the combustion chamber through the interstices between the pipes 10 and from the ashpit 41 may be controlled by adjusting either the size of the opening 40 by means of the slide plates 42 or by means of an adjustable passage element 47, which has been disposed in the distribution box in front of the pipes 10. This passage element may consist of two sets of perforated plates which are slidably arranged as described and claimed in our copending United States application Ser. No. 204,194, filed January 3, 1951. In this way the effective passage area can be altered without disturbing the uniform flow distribution of the air stream passing between the pipes 10 into the combustion chamber by changing the position of the plates with respect to each other.

The combustion gases leave the combustion chamber through the interstices between the pipes 11, from where they enter the smoke box 16. The conduits 48 connect the air distribution box with the smoke box. These conduits communicate with a tube 49 disposed in the smoke box, which is provided with a multiplicity of small apertures 50, through which secondary combustion air enters the smoke box in a direction perpendicular to the flow of combustible gases leaving the combustion chamber, as particularly described and claimed in our copending United States application Ser. No. 208,491, filed January 30, 1951. The amount of secondary air and also the ratio between the amounts of primary and secondary air may be regulated by means of the control valves 51. From the smoke box the combustion gases flow towards a boiler through a duct 52.

The water to be heated is introduced into the water jackets of the furnace through the inlet 53, whereas hot water or steam leaves the jackets through the outlet 54. From here it may be sent to the infeed of the boiler or it may be used for other purposes. The water jackets may be emptied through a tap-off valve 55.

In operation the fuel descends gradually by gravity from the bin 1 into the combustion chamber 5. The fuel pieces are prevented from dropping between the pipes 11 into the smoke box 16 by oblique fins 56 welded to said pipes. To prevent fine particles from collecting in the air distribution box 37 the lower ends 57 of the pipes 10 are bent towards the collecting header 14.

As a result of the horizontally directed and the additional obliquely directed primary air streams a main combustion zone is developed on the slag bed S, the form of which resembles that of the region which in Figure 1 has been designated by the reference symbol C. To protect the pipes 10 and the grate bars 17 against the heat of combustion insulating linings 58 and 59 are provided on the sides facing the combustion zones.

The term "main combustion zone" as used in the present application refers to the zone where the fuel is substantially consumed. The $CO_2$ produced in this zone passes through the incandescent fuel present between the combustion zone and the row of pipes 11. In this zone, which in Figure 1 is designated by the reference symbol R, the $CO_2$ gas is partly or completely reduced to CO. Subsequently, this gas passes between the pipes 11 into the smoke box, where it is mixed with the secondary air admitted through the apertures 50, so that the CO is oxidized to $CO_2$.

When designing furnace installations of different capacities, it is preferred to vary the dimensions in one direction only, for instance the width, with the length and the height of the various types being unaltered. In this manner, the diversity of parts required for the construction of the various types can be reduced. The necessity for modifying several parts of the furnace, however, cannot always be avoided. For every type of boiler, for instance, a slag pusher of a construction suited to the furnace is required.

By composing the slag pusher of several sections 20' the manufacture of sections according to one standard pattern will in certain cases suffice for making up slag removing devices suited to various types of furnace installations, and in all cases manufacture of sections according to comparatively few patterns will enable devices to be made up suited to a wide range of installation dimensions. In this manner, modelling, drawing and production costs can be cut down, and the inventory facilities of the factory relieved.

Where a range of furnace widths to be supplied with slag removing devices is contemplated such that manufacture of sections according to one standard pattern would involve connection of an undesirable large number of the slag moving sections, it will usually be found that two or three different widths can be chosen as standards, so that devices suited to all the furnaces of the dimensions contemplated can be made from these standard sections by combining a comparatively small number of selected standard sections.

As an example, by making two standard sections, one standard section 20" being 400 mm., and the other standard section 20''' being 500 mm. in width (see Figure 6), devices for a range of dimensions from 1200 mm. in width upwards can be prepared. Successive installations increasing in width by increments of 100 mm. can thereafter be prepared.

The following table shows the dimensions of the sections of the slag pusher for the types ranging from 1200 mm. up to 2000 mm. The number of elements amounts to three or four. When one standard element is to be used, the width of this element would be 100 mm. and the number of elements for the 2000 mm. type would amount to twenty.

| Type | Number of elements | | |
|---|---|---|---|
| | 400 mm. | 500 mm. | Total |
| 1,200 | 3 | | 3 |
| 1,300 | 2 | 1 | 3 |
| 1,400 | 1 | 2 | 3 |
| 1,500 | | 3 | 3 |
| 1,600 | 4 | | 4 |
| 1,700 | 3 | 1 | 4 |
| 1,800 | 2 | 2 | 4 |
| 1,900 | 1 | 3 | 4 |
| 2,000 | | 4 | 4 |

In the same way the guide shoe may be composed of several sections arranged and detachably secured in line abreast.

We claim:

1. A furnace for burning solid fuels comprising a combustion chamber having a main combustion zone and a final combustion zone positioned beneath and to the front of said main combustion zone, said combustion chamber being enclosed by walls provided with water jackets, a grate extending beneath said main and final combustion zones and having an ash pit therebelow, a slag pusher mounted entirely within the interior of said furnace and movable over said grate parallel thereto for moving combustion residues from beneath said main combustion zone to said final combustion zone, said slag pusher including a rack, a pinion cooperating with said rack for movement of said slag pusher, said pinion being mounted on a shaft protruding through the water jacket walls of said furnace, and a guide member secured to said slag pusher for sliding engagement with a horizontal portion of one of the water jacket walls of said furnace when said slag pusher is moved over said grate whereby heat absorbed by said slag pusher is transferred to the horizontal water jacket wall.

2. A furnace of the character described in claim 1 wherein said horizontal portion of the water jacket wall having engagement with said guide member is provided with guide plates for contact therewith, said guide plates being arranged in the direction of movement of said slag pusher and being spaced apart.

3. A furnace of the character described in claim 1 wherein said slag pusher includes at least one section arranged in the combustion chamber and detachably secured to said guide member, said section comprising a channel member enclosed at each side end and open at the top, said channel member forming a chamber, securing means provided in the chamber of said channel member for detachably securing the same to said guide member, said securing means being protected from heat from said combustion chamber by the ashes therefrom which are collected in the chamber of said channel member.

References Cited in the file of this patent

UNITED STATES PATENTS

| Number | Name | Date |
|---|---|---|
| 214,906 | Greene | Apr. 29, 1879 |
| 799,311 | Drake | Sept. 12, 1905 |
| 1,210,363 | Reagon | Dec. 26, 1916 |
| 1,283,668 | Cherry | Nov. 5, 1918 |
| 1,561,761 | Allen | Nov. 17, 1925 |
| 1,860,442 | Wares | May 31, 1932 |
| 2,044,348 | Chapple | June 16, 1936 |

FOREIGN PATENTS

| Number | Country | Date |
|---|---|---|
| 763,733 | France | Feb. 19, 1934 |
| 616,979 | Germany | Aug. 9, 1935 |
| 503,172 | Great Britain | Apr. 3, 1939 |